Feb. 12, 1924.
A. S. RAMAGE
1,483,835
PREPARING CHEMICAL PRODUCTS FROM OLEFINES AND OLEFINE CONTAINING MIXTURES
Filed March 7, 1918
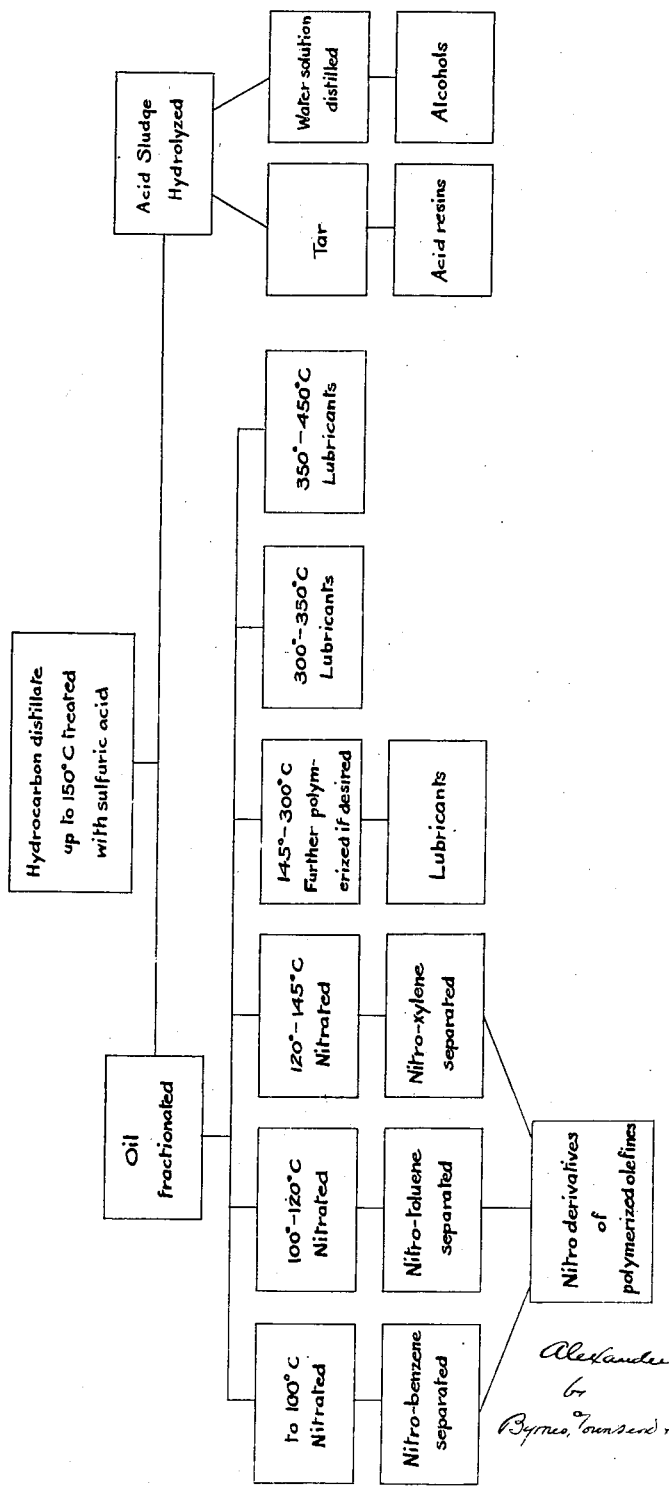

Patented Feb. 12, 1924.

1,483,835

UNITED STATES PATENT OFFICE.

ALEXANDER S. RAMAGE, OF DETROIT, MICHIGAN, ASSIGNOR TO BOSTAPH ENGINEERING CORPORATION, OF DETROIT, MICHIGAN, A CORPORATION OF NEW YORK.

PREPARING CHEMICAL PRODUCTS FROM OLEFINES AND OLEFINE-CONTAINING MIXTURES.

Application filed March 7, 1918. Serial No. 221,015.

*To all whom it may concern:*

Be it known that I, ALEXANDER S. RAMAGE, a citizen of the United States, residing at Detroit, in the county of Wayne and State of Michigan, have invented certain new and useful Improvements in Preparing Chemical Products from Olefines and Olefine-Containing Mixtures, of which the following is a specification.

This invention is a process of preparing chemical products, including nitro-derivatives, from olefines and mixtures thereof with aromatic hydrocarbons (benzol, toluol, xylol, etc.). The process will be particularly described by reference to its application to such hydrocarbon mixtures, including mixtures of olefine and aromatic hydrocarbons, as may be produced in the practice of the process described in my prior Patent 1,224,787, patented May 1, 1917. The invention is not, however, restricted to the treatment of hydrocarbon mixtures prepared in this particular manner, but is applicable generally to hydrocarbon mixtures rich in olefines, whether produced by the cracking or catalytic decomposition of mineral oils, or otherwise.

The following is a specific illustrative example of my process as applied to a hydrocarbon mixture containing components boiling between 20° and 150° C., and consisting of olefines and aromatic bodies in approximately equal proportions. My invention is not restricted, however, to the particular operating conditions and manipulations below described, nor to the performance of all of the steps involved in the production and recovery of the products formed.

The accompanying drawing is a flow sheet graphically indicating the essential steps of the preferred process as described below.

To a condensate of the character mentioned above I add about 20% by volume of 66° sulfuric acid, the acid being introduced very slowly with agitation and cooling, the temperature being preferably held below 40° C. The agitation is preferably continued for about ten minutes after the last of the acid has been added, in order to complete the reaction. Upon settling the mixture two layers are formed, viz. (1) an acid sludge; and (2) a supernatant mixture of liquid hydrocarbons, hereinafter referred to as the "oil".

The acid sludge consists essentially of:

(*a*) Acid sulfate derivatives of the lighter olefines, chiefly those up to and including $C_{10}H_{20}$.

(*b*) Acid resins derived chiefly from the higher olefines.

I add to the acid sludge an approximately equal volume of water, agitate for about ten minutes, and allow to stratify. Thereby I obtain a lower aqueous solution containing the alcohols derived from the acid sulfates by hydrolysis; this solution is distilled and the alcohols recovered. The upper layer is tarry in appearance and contains the acid resins. These are dissolved in dilute (say 10%) caustic soda, using just sufficient alkali to produce the soluble resin soaps. By addition of acid the acid resins are re-precipitated from these soaps in purified form. The resin is soluble in ether, alcohols and in solvent naphtha, but is substantially insoluble in paraffin hydrocarbons.

The "oil" formed by the original sulfuric acid treatment contains the aromatic hydrocarbons, and also bodies hereinafter designated as "polymerized olefines", said bodies resulting from the action of sulfuric acid upon the olefines of the original distillate, chiefly those of the lower boiling points (up to $C_8H_{16}$). I prefer to treat this oil as follows:

A sample of the oil is tested with 10% by volume of 66° sulfuric acid in order to make sure that sufficient acid was employed in the original treatment; under this test the acid should not be colored beyond a light straw color. In this connection it is pointed out that the bodies referred to above as "polymerized olefines" are not further acted upon by sulfuric acid under the conditions of the original treatment.

The oil is now fractionated, taking the following fractions:

| | |
|---|---|
| 1 | up to 100° |
| 2 | 100°–120° |
| 3 | 120°–145° |
| 4 | 145°–300° |
| 5 | 300°–350° |
| 6 | 350°–450° |

Fraction No. 1 contains the benzol together with some olefines. This entire fraction is nitrated under standard conditions, and observing the usual precautions for making mono-nitro-benzol. For example, for each 100 kilograms of hydrocarbon I may use 300 kilograms of nitrating acid consisting of 180 kilograms of 66° sulfuric acid and 120 kilograms of nitric acid of specific gravity 1.42. At the conclusion of the reaction the mixture is permitted to settle and the spent acid run off. The crude nitrated product comprises nitro-benzol and nitro-derivatives of the olefines. These latter bodies are readily soluble in dilute caustic alkali, and I separate them by treating the mixture with an excess of dilute (5–10%) caustic soda, which leaves the nitro-benzene substantially pure.

Fraction No. 2 is treated in an identical manner, the alkaline treatment leaving practically pure nitro-toluol, which is substantially pure mono-nitro-toluol, in case the operation has been carried out with the production of this body in view.

The alkaline solutions of the nitro-derivatives of the olefines prepared in the course of the above operations may be neutralized with acid, yielding a solid precipitate, which may be further purified by washing with water. Further nitration of this precipitate yields a crystallizable nitro-body. Both of the above nitro-bodies are soluble in cold alcohol.

Fraction No. 3 consists of xylol and olefine bodies, and is treated in the same manner as fractions Nos. 1 and 2, yielding nitro-xylol and nitro-derivatives of the olefines.

Fraction No. 4 is composed esentially of olefine bodies up to $C_{15}H_{30}$. The effect of the distillation to which this fraction has been subjected is such that these olefine bodies are again susceptible of polymerization under the action of 66° sulfuric acid; and they are preferably so polymerized, whereby products of still higher boiling point are obtained. The treatment of this fraction with sulfuric acid, including the formation and separation of an acid sludge, is substantially as already described in connection with the original distillate, except that the acid sludge consists practically entirely of acid resins, being substantially free from hydrolyzable acid derivatives. The operation of polymerizing the olefines and distilling the polymerized products may be repeated if desired one or more times in order to convert practically the whole of the material into high-boiling products suitable for lubricating purposes.

Fractions Nos. 5 and 6 may be used directly for lubricating purposes, and are characterized by a high lubricating value and extremely low freezing point, being capable of withstanding the ice-salt test. Or these fractions may serve as the basis for the production of various chemical bodies by synthetic methods.

In case olefines only are present in the original hydrocarbon mixture (absence of aromatics) the manipulative features of the process in so far as the polymerization of the olefines and the production of the acid sludge are concerned, remain essentially as hereinabove described, the proportion of sulfuric acid used being sufficient for complete transformation of the olefines, that is to say, sufficient to yield a product which upon further testing with sulfuric acid of like concentration exhibits little or no evidence of further action. Nitration of the fractions need not of course be practiced in this case except as nitro-derivatives of the olefines are desired. The polymerized olefines may be fractionated as above described to isolate the higher-boiling products; and the lower-boiling fractions may be subjected again to the polymerizing treatment, precisely as above described.

The statement in certain claims that the sulfuric acid is used in proportion sufficient to transform the olefines has reference to both types of transformation herein mentioned, that is to say, the polymerization and the formation of hydrolyzable sulfuric acid derivatives. In so far as acids other than sulfuric acid may effect the polymerization of the olefines, such acids are to be regarded as equivalent to sulfuric acid for the purposes of this invention. Strong hydrochloric acid for example is capable of bringing about a like polymerization.

This application is a continuation, in part of my copending application Serial Number 160,224, filed April 6, 1917.

I claim:—

1. The process of treating hydrocarbon oils consisting essentially of olefine and aromatic hydrocarbons, consisting in reacting thereon with sulfuric acid in proportion sufficient to transform substantially all of the olefines, into polymerized products and hydrolyzable sulfuric acid derivatives separating the treated oil from the acid sludge, and fractionally distilling the aromatic hydrocarbons from the higher-boiling polymerized olefines.

2. In a process of preparing high-boiling olefines from low-boiling olefines, the steps which consist in treating a hydrocarbon oil containing low-boiling olefines with sulfuric acid in proportion sufficient to effect a substantially complete transformation of the olefines, into polymerized products and hydrolyzable sulfuric acid derivatives separting the treated oil from the acid sludge, and fractionally distilling the remaining low-boiling hydrocarbons from the high-boiling polymerized olefines.

3. In a process of preparing high-boiling olefines from low-boiling olefines, the steps which consist in treating a hydrocarbon oil containing low-boiling olefines with sulfuric acid in proportion sufficient to effect a substantially complete transformation of the olefines, into polymerized products and hydrolyzable sulfuric acid derivatives separating the treated oil from the acid sludge, separating olefines boiling at about 45°–300° C., by fractional distillation, and further polymerizing the same.

4. The process of treating hydrocarbon oils containing olefines and aromatic bodies, which consists in reacting thereon with strong sulfuric acid in proportion sufficient to transform substantially all of the olefines, into polymerized products and hydrolyzable sulfuric acid derivatives withdrawing the resulting acid sludge, and fractionally separating the aromatic bodies from the high-boiling bodies resulting from the polymerization of the olefines.

In testimony whereof, I affix my signature.

ALEXANDER S. RAMAGE.